United States Patent [19]

Cruz, Jr. et al.

[11] 3,931,082

[45] Jan. 6, 1976

[54] MICROCRYSTALLINE POLYESTERS AND DISPERSIONS THEREOF

[75] Inventors: Mamerto M. Cruz, Jr., Pennington, N.J.; Nicholas Z. Erdi, New York, N.Y.; Orlando A. Battista, Yardley, Pa.

[73] Assignee: FMC Corporation, Philadelphia, Pa.

[22] Filed: Apr. 23, 1974

[21] Appl. No.: 463,313

Related U.S. Application Data

[63] Continuation of Ser. No. 166,601, July 27, 1971, abandoned, which is a continuation-in-part of Ser. No. 760,358, Sept. 17, 1968, abandoned.

[52] U.S. Cl. ........... 260/29.2 N; 260/9; 260/29.2 E; 260/31.8 XA; 260/32.6 R; 260/32.6 NA; 260/32.8 N; 260/33.4 R; 260/33.4 P; 260/47 XA; 260/49; 260/75 T; 260/77.5 D; 260/857; 264/233

[51] Int. Cl.² .......................................... C08G 63/12

[58] Field of Search ........ 260/29.2 E, 75 T, 29.2 N, 260/9, 31.8 XA, 32.6 R, 32.6 NA, 32.8 N, 33.4 R, 33.4 P, 47 XA, 49, 77.5 D, 857

[56] References Cited

UNITED STATES PATENTS

| | | | |
|---|---|---|---|
| 2,595,679 | 5/1952 | Lew | 260/75 T |
| 2,945,840 | 7/1960 | Roberts et al. | 260/29.2 E |
| 3,014,011 | 12/1961 | Zoetbrood | 260/75 T |
| 3,115,476 | 12/1963 | Agens et al. | 260/29.2 E |
| 3,135,577 | 6/1964 | Watson | 260/75 T |
| 3,190,718 | 6/1965 | Schoeneberg et al. | 264/290 |
| 3,214,500 | 10/1965 | Maerov et al. | 8/115.5 |
| 3,377,323 | 4/1968 | Ioka et al. | 260/78 |
| 3,472,608 | 10/1969 | Kingston | 8/100 |
| 3,510,457 | 5/1970 | Janssen | 260/75 T |
| 3,536,647 | 10/1970 | Battista | 260/78 S |

*Primary Examiner*—Murray Tillman
*Assistant Examiner*—A. H. Koeckert

[57] ABSTRACT

Colloidally dispersible microcrystalline polyesters are prepared by a hydrolytic removal of amorphous regions in synthetic, linear polyesters followed by a mechanical disintegration of the resulting aggregated microcrystals to produce discrete microcrystalline particles at least 5% by weight having a particle size not exceeding 1 micron. The microcrystalline polyesters exhibit a sharp X-ray diffraction pattern and distinctly modified thermal behavior as compared to the parent or precursor polyester resin.

10 Claims, No Drawings

MICROCRYSTALLINE POLYESTERS AND DISPERSIONS THEREOF

This application is a continuation of application Ser. No. 166,601, filed July 27, 1971, which application is a continuation-in-part of our copending application Ser. No. 760,358, filed Sept. 17, 1968, both now abandoned.

FIELD OF THE INVENTION

This invention relates to finely divided, discrete microcrystalline polyesters exhibiting a sharp X-ray diffraction pattern and distinctly modified thermal behavior as compared to the precursor polyester resin and being further characterized in their ability to form stable colloidal dispersions in liquid media having a minimal swelling action on the microcrystals.

DESCRIPTION OF THE PRIOR ART

It is known that synthetic linear polyesters possess a crystalline-amorphous network, or morphological structure consisting of regions of high order commonly referred to as crystalline and regions of low order commonly referred to as amorphous. In this network structure, primary chains extend through a series of microcrystals connecting them by amorphous regions or hinges involving primary molecular bonds. Because of the strength of the primary molecular bonds, it is impractical to free the microcrystals by mechanical means, such as attrition or grinding. Dissolving and reprecipitation of the polyester results merely in a rearrangement of the crystalline-amorphous network, leading once more to a continuous network of crystalline and amorphous areas, connected by primary molecular bonds.

It is also known that synthetic linear polyesters having molecular weights sufficiently high to allow conversion into fibers, possess toughness and elastic characteristics which make grinding of the polyesters into finely divided particles exceedingly difficult. Precipitation of such polyesters from a solution tends to produce stringy, cohesive masses. While low molecular weight polyesters can be ground to a finely divided state, the resulting particles are still characterized by a typical polyester crystalline-amorphous network structure. They do not form stable colloidal dispersions and gels in liquid swelling media as defined herein.

Typical of the prior art are U.S. Pat. No. 3,377,323 issued Apr. 9, 1968 and U.S. Pat. No. 3,510,457 issued May 5, 1970. In accordance with the first of these patents, the polyester and water are heated under pressure to a temperature below the melting point of the polyester but high enough to dissolve or "suspend" the polyester and spraying the solution to form a finely divided powder. In accordance with the second patent, the flowable melt of the polyester is stirred into a liquid, organic non-solvent for the polyester to form a finely divided granulate. In these methods, the finely divided particles possess the typical crystalline-amorphous network structure and a normal thermal behaviour.

GENERAL DESCRIPTION OF THE INVENTION

The principal purpose of this invention is to provide finely divided, microcrystalline, synthetic, linear polyesters capable of forming stable, colloidal dispersions or soliquoids in liquid swelling media, as defined herein. A further purpose of the invention is to provide stable, colloidal dispersions or soliquoids of microcrystalline, synthetic, linear polyesters in liquid swelling media, as defined herein.

In accordance with the present invention, high molecular weight, at least partially crystalline, synthetic linear polyester resins are subjected to a two-stage process to provide the finely divided microcrystalline polyester product. The first step of the process consits of subjecting the parent or precursor polyester resin to hydrolytic conditions whereby the amorphous portions of the polymer chains are cleaved, solubilized and removed leaving as a residue the more crystalline portions or regions. The selective hydrolysis is achieved by conducting the reaction in a medium which exerts a mild swelling action on the polyester resin without disturbing its crystallinity. Ideally the medium should produce just sufficient swelling whereby the hydrolytic agent can penetrate to the amorphous areas of the polyester without substantially effecting the crystalline integrity. The residue exhibits a sharper X-ray diffraction pattern as compared to that of the precursor resin. The residue also exhibits a distinctly modified thermal behaviour not possessed by polyester resins.

The residue comprising aggregated microcrystals of lower molecular weight is subjected to the second stage of the process which consists of a mechanical disintegration so as to free microcrystals. The mechanical disintegration is effected by a mechanical shearing action such as provided by attrition mills, planetary mixers, sonic mixers, grinding mills and the like. Preferably, the mechanical disintegration is effected in a liquid medium which exerts a mild swelling action on the polyester resin.

Liquid media for the purposes of this invention which exert a mild or controlled swelling action can be termed "controlled liquid swelling media" and are liquid media which have a minimum swelling action towards the microcrystals and may solvate or tend to solvate the surface of the individual microcrystals but do not attack and destroy the lateral order or crystallinity in the interior of the microcrystals. Although the polyesters are relatively insensitive to water, the microcrystalline polyester products of this invention, particularly those having essentially all material below one micron in size and containing the particles below 0.01 micron in size are dispersible in water to form stable dispersions and gels. Water is, therefore, deemed a liquid swelling media for the purposes of the invention. Other satisfactory agents include, for example, dilute aqueous solutions of lower aliphatic acids including formic, acetic, dichloroacetic and trichloroacetic acids, lower aliphatic alcohols including methanol, ethanol and isopropanol, water-soluble polyhydric alcohols including, for example, ethylene glycol, water-soluble polyethylene glycols, propylene glycol, water-soluble polypropylene glycols and glycerol, water-soluble polyacrylamides, mixtures of phenol, cresol, and resorcinol with water, ketones such as acetones, aldehydes such as formaldehyde, acetaldehyde and other organic solvents such as ethyl acetate, formamide, dimethylformamide, etc.

In general it has been ascertained that certain types of organic liquids, either alone or in admixture or in admixture with water, are capable of providing the swelling effect to a satisfactory degree. The particular class of polyester being degraded as well as its degree of crystallinity will of course determine the choice of solvents to achieve optimum performance. The hydrolytic agent can be any of the types capable of cleaving ester linkages although basic materials are preferred. Suitable bases include both organic and inorganic members and in this connection reference is made to the lower aliphatic amines, e.g. ethylamine, n-propylamine, urea, ammonium hydroxide and its alkylated derivatives, as well as such inorganic bases as the alkali metal carbonates and hydroxides, preferred examples of the latter being sodium and potassium hydroxides. An especially effective hydrolytic medium, particularly for polycarbonate resins, consists of ethylacetate containing a small quantity of ethanolic sodium hydroxide. When refluxed for a few hours in the aforedescribed mixture, polycarbonate resin granules or fibers are converted almost quantitatively into microcrystalline material.

A characteristic of microcrystalline polymers which have been substantially freed of amorphous areas, is the ease with which they can be crushed to a fine powder. In fact, this can be utilized in a convenient manner for optimizing the choice of the hydrolytic medium as well as monitoring the course of the reaction. All that is required is that samples of the particular polyester resin be removed from the reaction mixture from time to time, dried and placed between two microscope slides and gently attrited using mild finger pressure. Once the amorphous areas have been hydrolyzed, leaving a matrix of microcrystalline aggregates, the polymer particles readily crush when rubbed between the glass slides.

Where the polymer particles become sticky or tacky, this signifies that the solvent medium is too strong and that the crystalline network is being unduly loosened or even partially dissolved. On the other hand, if after lengthy hydrolytic treatment, no sign of crystallinity has developed, this signifies that the particular solvent medium failed to exert even minimal swelling of the polymer so as to enable the hydrolytic agent to penetrate to the amorphous areas.

In general, it has been our finding that the swelling required to achieve maximum hydrolytic attack of the amorphous area of the polymer, while retaining its crystallinity, can be ascertained after a few trial reactions. Those skilled in the polymer art are familiar with the effect of solvents on polymers and will be able to select optimum hydrolytic media for obtaining the microcrystalline polyesters in accordance with the invention with a minimum of testing.

The temperature at which the hydrolysis of the polyester is carried out is not particularly critical and normally will be from about room temperature to about 200°C. We have found it convenient to reflux the polyester in the hydrolytic medium and where common organic solvents are used for this purpose, the temperature will probably be in the range of about 100°C.

The duration of the hydrolysis will vary according to the temperature and the specific liquid media, as well as the particular polyester employed. Normally from about ½ hour to about 10 hours will produce satisfactory yields and results. As previously pointed out, in no case should the solvent exert such a strong swelling action on the polyester as to disturb its crystalline integrity.

So far as we have been able to ascertain, the point of attack of the hydrolytic reagent is directed towards the ester linkage and as a consequence, the terminal groups in the hydrolyzed polymer will be carboxy and hydroxy functions, when using mineral bases, whereas the use of amines will form a terminal amide group.

Although it can be used directly as purchased or prepared, the polyester is preferably subjected to a pre-annealing treatment in order to increase its crystallinity. A typical procedure consists of heating polyester resin pellets at about 150°C. for one hour in a nitrogen atmosphere. Another satisfactory procedure consists of immersing the pellets in an inert liquid such as Dow-Corning Silicon 200 for about four hours in the general range of 125°C. to 150°C. The treated material is washed free of silicon oil with a suitable solvent such as acetone and then air dried.

The synthetic, linear polyester used herein are well known polymeric materials, the description and preparation of which are set forth in various journals and texts pertaining to polymer science. Exemplary at least partially crystalline polyesters which can be converted to the microcrystalline state by the process of the invention include the following: poly(ethylene terephthalate); poly(1,4-butylene terephthalate); poly (ester of 1,4-cyclohexane-dimethanol with terephthalic acid); poly (ester of ethylene glycol with terephthalic acid and an aliphatic dibasic acid, e.g. malonic, adipic, fumaric, maleic, sebacic acid and the like); poly(ester of neopentyl glycol with phthalic acid); poly(alkylene carbonates) such as poly(ethylene carbonate), poly (1,4-butylene carbonate), poly(1,5-pentylene carbonate), poly (ester of carbonic acid with bisphenols, e.g. 4,4′-sec-butylidenediphenol, 4,4′-isopropylidenediphenol, 4,4′-methylenediphenol, 1,4-cyclohexanedimethanol, 4,4′-sulfonyldiphenol including mixed esters thereof). The polyester may contain modifiers such as 5-sulfo-isophthalic acid provided that the amount of the modifier is not sufficient to eliminate the crystalline-amorphous structure of the polyester.

The mechanical disintegration is carried out to such an extent that the resulting particulate material is characterized by forming a stable soliquoid in the liquid swelling medium in which it is attrited or in which it is subsequently dispersed. The amount of disintegration must be sufficient whereby at least 5% by weight has a particle size not exceeding about one micron and preferably until at least 95% by weight has a particle size not greater than about one micron and at least about 5% has a particle size no greater than about 0.1 micron. By a stable soliquoid is understood the attrited material will not settle out, but remains suspended indefinitely even for periods measured in terms of weeks or months. At lower concentrations of the attrited material the soliquoids may be classed as dispersions, while at higher concentrations they may be classed as gels.

Following the mechanical disintegration of the hydrolyzed material, the resulting product, whether a dispersion or gel may be used as such; or it may be dried; or it may be desirable to separate it into factions having a more uniform particle size distribution. The dried attrited material is readily redispersed in liquid swelling media of the type aforesaid, with the help of a blender-type agitator.

For obtaining dry products, a number of drying procedures are available and while redispersible material results from each procedure, some are more advantageous and desirable than others. Examples of drying include freeze-drying, spray-drying, drum-drying, drying by solvent displacement and oven drying. Fractionation of the attrited products may be affected by such separation techniques as mechanical sifting, settling in a liquid or centrifuging. Cyclone type separators are very useful for the dry product.

Shaped articles may be formed from the stable dispersions of this invention by forming, for example, by extruding or casting the dispersion in the desired shape and washing or immersing the article in water, or a dilute alkaline solution, such as sodium hydroxide. Or, the microcrystalline polyester gels or the dry attrited material may be blended with an appropriate plasticizing agent and the blend extruded, molded, or cast into various shapes and dried. The dispersions and gels are often useful in the production of films, as coatings for various base materials, as exemplified by paper, wood and the like, and as binding agents in non-woven fabrics. The microcrystalline polyesters of this invention are also useful for admixture for other microcrystalline products, such as microcrystalline cellulose, microcrystalline starch, microcrystalline nylon in the production of molding powders and structural objects.

The following examples are set forth to illustrate the production of finely divided microcrystalline polyesters by the two stage process as described herein. In Examples 1, 2 and 3, poly(ethylene terephthalate) staple fibers were used as the raw material, while fiber forming poly(ethylene terephthalate) resin pellets were utilized after being heat annealed, as described hereinbefore, as the raw materials in Examples 4, 5 and 6. In the examples these raw materials are identified as PET. In Examples 7 and 8, the resin was a fiber forming Bisphenol A polycarbonate, a poly(ester of 4,4'-isopropylidenediphenol with carbonic acid), identified as BAP.

In Examples 1 through 7 the resin and liquid were introduced into a pressure vessel and the mass heated to 150°C. ± 5°C. and maintained at such temperature under the developed pressure for various periods of time. In Examples 1 through 5 no agitation of the reaction mass was utilized while occasional agitation was used in Examples 6 and 7. At the end of the stated period, the vessel was slowly vented to the atmosphere and the liquid drained from the insoluble residue. The residue was then washed with water until the pH of the washings was 7–8 and the residue subsequently attrited in the form of a wet cake. In Example 8, the mass was refluxed and after washing of the residue, the residue was dried at 70°C. The dried residue was subsequently attrited to form a 25% solids gel in a liquid consisting of 70 ml. isopropanol, 10 ml. carbon tetrachloride and 20 ml. water.

Table 1 sets forth the reaction masses, periods of treatment and the yields of the examples:

TABLE 1

| | Composition | Time | Yield |
|---|---|---|---|
| 1. | 10.0 g Pet fiber<br>3.5 g n-propylamine<br>1.75 g Ethylene glycol<br>135.5 ml Water | 3 hrs. | 80% |
| 2. | 10.0 g PET fiber<br>2.0 g Ethylene diamine<br>1.0 g Ethylene glycol<br>137.0 ml Water | 4 hrs. | 82% |
| 3. | 10.0 g PET fiber<br>3.5 g Urea<br>136.5 ml Water | 4 hrs. | 80% |
| 4. | 10.0 g PET pellets<br>3.5 g n-propylamine<br>136.5 ml Water | 3 hrs. | 72% |
| 5. | 10.0 g PET pellets<br>3.5 g n-propylamine<br>1.75 g Ethylene glycol<br>134.0 ml Water | 3 hrs. | 74% |
| 6. | 10.0 g 60 mesh PET pellets<br>5.0 ml Ammonium hydroxide (29.5%)<br>136.5 ml Water | 2 hrs. | 85% |
| 7. | 10.0 g BAP<br>2.5 ml Ammonium hydroxide (29.5%)<br>136.0 ml Water | 3 hrs. | 61% |
| 8. | 60.0 g BAP<br>600.0 ml Ethyl acetate<br>30.0 ml Soln. prepared by adding 5 ml of soln. containing 1.0 g sodium hydroxide per 99 ml absolute ethanol to 100 ml ethyl acetate | 3 hrs. | — |

EXAMPLE 9

In preparing samples of the microcrystalline polyester product for characterization studies, polyethylene terephthalate pellets (PET) Wiley milled to pass a 10 mesh screen (2 mm. openings) were subjected to hydrolytic treatment in an aqueous solution containing 4.5% by weight of ammonia. To 900 gms. of the polyethylene terephthalate pellets there was added 2100 gms. of the aqueous solution in a digester. The digester was sealed and the mass heated to 125°C. under a developed pressure (about 89 psig) and maintained at this temperature for about 1.25 hours. At the conclusion of the heating period, the pressure was reduced to atmospheric pressure by venting the water vapor and ammonia. The liquid was drained and the residue cooled by washing with distilled water. The residue was subjected to attrition in a Readco Continuous Processor in the form of a wet cake, 50–55% solids. Properties of the precursor resin and the microcrystalline product (MCPET) were as set forth in the table which follows.

TABLE 2

| Property | PET | MCPET |
|---|---|---|
| Molecular weight | 17.400 | 2.960 |
| Density, g/cc | 1.342 | 1.413 |
| Intrinsic viscosity | 0.619 | 0.083 |
| Melting Point (DSC) | | |
| First peak - °C | None | 230–232 |
| Second peak - °C | 250–255 | 244–247 |
| Heat of crystallization | | |
| After 1st melt | 7.9 cal/gm | 12 cal/gm |
| After 2nd melt | — | 13 cal/gm |
| Crystallinity | 5% | 71.5% |
| Particle size | — | 80% <1 micron<br>70% <0.2 " |

The viscosities of the materials were measured at 30°C. using as a solvent a mixture of 60 parts by weight of phenol and 40 parts by weight of s-tetrachloroethane. The intrinsic viscosities were calculated from the measured viscosities of the solutions and the solvent.

The thermal properties were determined by the use of a Perkins-Elmer DSC-1B differential scanning recording calorimeter. The polyethylene terephthalate (PET) exhibited a typical single endotherm which is characteristic of polyesters. The microcrystalline polyethylene terephthalate (MCPET) exhibited two separate melting point ranges or endotherms which is characteristic of the microcrystalline polyesters prepared in accordance with the present invention.

We claim:

1. A process for separating a finely divided, microcrystalline polyester particulate product having two separate melting point ranges from a fiber forming, synthetic, linear polyester having an inherent crystalline-amorphous morphology and a single melting point range comprising hydrolyzing the polyester with a basic solution comprising an aqueous solution of a lower aliphatic amine or ammonia whereby ester groups in the amorphous regions are preferentially hydrolyzed and solubilized without substantial dissolution of the crystalline regions thereby forming a polyester material having a terminal amide group and having a higher crystallinity than the precursor polyester, removing solubilized amorphous regions, recovering an insoluble microcrystalline polyester having a terminal amide group and two separate melting point ranges and then mechanically disintegrating the recovered microcrystalline polyester until at least 5% by weight has a particle size not exceeding 1 micron.

2. A process as defined in claim 1 wherein a fiber forming polyester is annealed prior to the hydrolyzing treatment.

3. A process as defined in claim 1 wherein the fiber forming polyester is poly(ethylene terephthalate) and the basic solution is an aqueous solution of ammonia.

4. A process as defined in claim 1 wherein the fiber forming polyester is poly(ester of 4,4'-isopropylidenediphenol with carbonic acid).

5. An article of manufacture comprising a finely divided, mechanically disintegrated, microcrystalline, synthetic, linear polyester product separated from a fiber forming, synthetic, linear polyester having an inherent crystalline-amorphous morphology and a single melting point range, the microcrystalline polyester product, in contrast to the fiber forming polyester, having a terminal amide group being substantially free of amorphous portions of the polyester chains, exhibiting a sharper x-ray diffraction pattern, having a lower molecular weight, having two separate melting point ranges, consisting of particles at least 5% by weight of which have a particle size not exceeding about 1 micron and being further characterized in forming a stable, colloidal soliquoid in liquid media having a minimal swelling action on the microcrystals which may solvate the surfaces without destroying the interior of the microcrystals.

6. An article of manufacture as defined in claim 5 wherein the mechanically disintegrated polyester product consists of particles at least 95% by weight of which have a particle size not exceeding about one micron and about at least 5% by weight of which have a particle size not exceeding 0.1 micron.

7. An article of manufacture as defined in claim 5 which is in the form of a soliquoid of the mechanically disintegrated polyester product in a liquid media having a minimal swelling action on the microcrystals which may solvate the surfaces without destroying the interior of the microcrystals.

8. An article of manufacture as defined in claim 5 which is in the form of a soliquoid of the mechanical disintegrated polyester product in an aqueous media having a minimal swelling action on the microcrystals which may solvate the surfaces without destroying the interior of the microcrystals.

9. An article of manufacture as defined in claim 5 which is in the form of a soliquoid of the mechanically disintegrated polyester product in water.

10. An article of manufacture as defined in claim 5 which is in the form of a soliquoid of the mechanically disintegrated polyester product in an organic liquid media having a minimal swelling action on the microcrystals which may solvate the surfaces without destroying the interior of the microcrystals.

* * * * *

UNITED STATES PATENT OFFICE
CERTIFICATE OF CORRECTION

PATENT NO. : 3,931,082

DATED : January 6, 1976

INVENTOR(S) : MAMERTO M. CRUZ, JR., NICHOLAS Z. ERDU and ORLANDO A. BATTISTA

It is certified that error appears in the above-identified patent and that said Letters Patent are hereby corrected as shown below:

Column 2, line 8 "consits" should read --consists--.

Column 6, Table 2, line 40 "17.400" should read --17,400--.

Column 6, Table 2, line 40 "2.960" should read --2,960--.

Signed and Sealed this

Fourteenth Day of September 1976

[SEAL]

Attest:

RUTH C. MASON
*Attesting Officer*

C. MARSHALL DANN
*Commissioner of Patents and Trademarks*